Sept. 19, 1933.  A. BERROTH  1,927,150
MEASURING INSTRUMENT FOR INVESTIGATING GRAVITATION
Filed Oct. 26, 1926
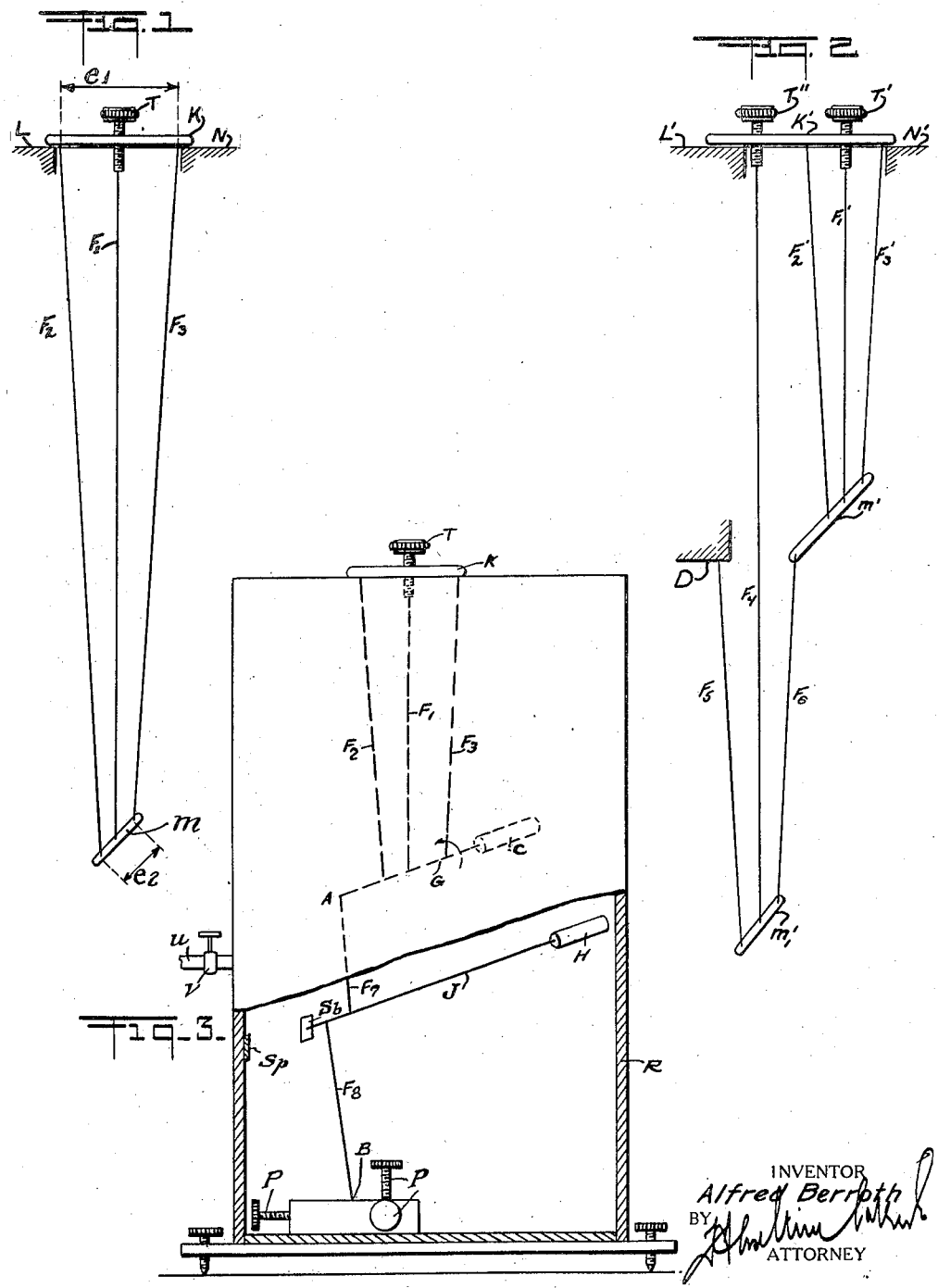

Patented Sept. 19, 1933

1,927,150

UNITED STATES PATENT OFFICE 1,927,150

MEASURING INSTRUMENT FOR INVESTI-
GATING GRAVITATION

Alfred Berroth, Potsdam, near Berlin, Germany

Application October 26, 1926, Serial No. 144,317,
and in Germany April 29, 1926

3 Claims. (Cl. 265—1)

The present invention relates to apparatus for determining the variations in the attractive force between masses and particularly in the gravitational or magnetic attraction exerted on a body by the earth due to the fact that the field of force in which the body is situated, varies.

A heavy body suspended from two or more threads is in a state of equilibrium and consequently at rest when the centre of gravity of the mass is at the lowest point. If rotation and consequently a lifting of the body be effected by any impressed force the body tends to return to its original position, and therefore a restoring couple which is opposed to said impressed force, and which is proportional to the sine of the angle of deflection, is set up due to the action of gravity. The force tending to return the body to its original position is the greater the heavier the body which is suspended from the thread.

If the body and the impressed force do not change, the magnitude of the variation of the gravitational force can be deduced from the rotation of the body when the external force to which the instrument is subject has changed.

The impressed force which causes the displacement of the body from its position of rest, must be capable of being increased to such a degree that the angle of deflection of the body can be varied, so that an extremely slight variation of the external force produces immediately a very large change in the deflection. The impressed force may conveniently be produced by a single fine wire which does not support much of the weight of the body and which is attached to the centre of the body, the angle of torsion of which is increased to such an extent that the body is deflected through any desired angle. In this case a state of equilibrium is obtained between the torsional couple due to the twisting of the wire and the oppositely directed restoring couple due to the displacement of the bifilarly suspended body. The couple exerted by the wire in consequence of a definite twist remains, if the wire is of suitable material, as experiments have shown, constant for a long time.

Now as the gravitational force on the body, i. e., the weight of the body varies, the restoring couple and consequently the angle of deflection of the body must also vary, and a new position of equilibrium must therefore be reached and the amount of movement of the body from the previous position of equilibrium forms a measure of the variation in the strength of the gravitational field.

In the accompanying drawing is shown an apparatus which is suitable for carrying out the measurements.

Figure 1 is a partial vertical section of the apparatus showing the suspended weight in deflected position.

Figure 2 is a partial vertical section of a modification of the apparatus.

Figure 3 is an elevation of the apparatus illustrating the casing partially cut away, and showing the manner of mounting and of reading the deflection of the suspended body.

The apparatus comprises a torsion head T threaded into a plate K which is supported on the shoulders L, N of a suitable casing. Suspended from said plate K by means of fine wires $F_2$ and $F_3$ is the body $m$, the variations in the weight of which are to be determined. Said body $m$ may be conveniently formed into a bar and the fine wires $F_2$ and $F_3$ attached to the ends thereof. A fine wire $F_1$, which supports only a small portion of the weight of the body, is connected at the top to the torsion head T and at the bottom to the center of the body $m$, so that by rotating the torsion head T the fine wire $F_1$ and with it the body $m$ can be rotated. In order to avoid errors due to variations of temperature, the fine wires are made of a material which is not susceptible to changes in its modulus of torsional elasticity with the changes in temperature, such as, for instance, the "invar" or any like special steel used for the manufacture of watch balances. Otherwise the sensitiveness to temperature of said fine wires would bring about a change of the established equilibrium at varying temperature, and said change of equilibrium would then be superimposed on the movement of the mass to be measured.

The wire or thread F always remains in a rotated or turned condition in all positions of the instrument, even in arrested condition during transport of the same.

Figure 2 illustrates a modification of the apparatus in which two torsion heads T', T'' are threaded into a plate K' which is supported on the shoulders L', N' of any suitable casing, not shown. Fine wires $F''_2$ and $F''_3$ suspend the body $m'$ from the plate A'. A second body $m'_1$ is suspended by means of fine wires $F_5$ and $F_6$ from the shoulder D of the casing, not shown, and the extremity of the body $m'$. A torsion wire $F_4$ which does not carry an appreciable weight of the small bar $m'_1$ is attached to the torsion head T'' at the top and at the bottom to the center of the small bar $m'_1$. Such a combination of features greatly increases the sensitivity of the apparatus.

Another increase of the sensitivity of such an apparatus may be obtained by connecting the bifilar suspension with a horizontal pendulum G, see Figure 3. Horizontal pendulum G carries a weight C on one end and is connected at its other extremity to a second horizontal pendulum J by means of the fine wire $F_7$. Pendulum J has a weight H positioned at one extremity and is connected by fine wire $F_8$ to the lower fixed point B, which may be regulated by thumb-screws P to a position vertical to A.

Horizontal pendulum J has positioned on one extremity a mirror $S_b$ which indicates any deflection from the position of equilibrium. A second mirror $S_p$ is immovably mounted on the casing R whereby any small variation of the pendulum J may be observed when the instrument is transported. The whole system is arranged in a quartz casing R to protect the same from variations in temperature. A pipe $u$ extends into casing R and is adapted to be connected to any suitable vacuum creating means, not shown. A valve V is inserted in pipe W and adapted to completely close said pipe and to regulate the decrease or increase of the vacuum within the tube R.

To carry out the measurements the procedure is as follows:

By rotating the torsion head an angle of deflection is imparted to the body which differs by about 90° from that position in which the body was situated before the thread $F_1$ was torsioned. The only important point in carrying out this operation is so to choose the angle of said deflection of the suspended body that the slightest variation in the strength of the gravitational field of force shall produce a maximum variation in said angle of deflection.

The instrument is now left for a time to itself, so that the body comes to rest in its position of equilibrium. When this position of equilibrium of the body has been determined, without anything being done to cause alteration in the torsion of the thread $F_1$ the apparatus is removed to another place. If the gravitational field at the second place differs from that at the place where the instrument first was, the couple tending to restore the body to its normal position and consequently the angle of deflection of the mass, must vary. It is therefore possible to draw conclusions as to the variations in the field of force from the variations in the angle of deflection.

The position of the mass is indicated by the relative position of its mirror with respect to a stationary mirror, while in order to obtain a reading, a scale which is preferably located outside the instrument may be viewed through a telescope or the like in the movable mirror, as is usual in many optical instruments for taking observations. On the other hand, in the case of photographically recording the results of the instrument, a lamp filament may be reflected by a lens in double manner across the two mirrors. The quartz of the mirror may be rendered transparent by grinding the same, or a viewing window may be inserted therein.

As already indicated above, the observation is either made optically upon a scale, or registered on photo-sensitive paper. The principal point in this connection, is to observe the relative change in position of the movable mirror, or in the case of a plurality of stations, to observe the different changes of position of the mirror in relation to a normal position at a base station.

An estimate of the sensitivity of the apparatus may be made by varying the air pressure in the tube R by means of a pneumatic pump so that by reason of the buoyancy of the suspended body, the net vertical thrust on the body is changed. Thus its equilibrium is disturbed and a slight deflection of the suspended body is produced. If the volume of the body is known, the change in vertical thrust on the body for the given change of pressure in the tube can be estimated, as is well-known in practice, so that the force required to produce the observed deflection of the body can be determined, and in this way the sensitivity can be measured.

Further, by determining the sensitivity of the apparatus when the body is deflected through various angles, it is possible to find the angle of deflection for which the apparatus is most sensitive to small changes of upward thrust. The most sensitive zone may also be determined approximately by noticing the time of swing of the suspended body, which is a maximum when the desired conditions are obtained.

If a magnetic body is suspended in place of a body subject only to gravitational actions, then it is obviously possible to use the instrument in determining the variation of the vertical component of the earth's magnetic field.

The apparatus is introduced into a magnetic field in the same manner as it would be introduced into a gravitational field.

If the horizontal diameter of the suspended iron weight is small with respect to the vertical diameter of the weight, it may be assumed that any variations in horizontal intensity will exert a relatively small influence within a working area of about 1,000 sq. km., more or less, as the poles of the magnet are superposed vertically above each other. The position of the casing is, of course unimportant and of no effect.

In order to find the variations in the vertical intensity of terrestial magnetism, the variations in gravitational attraction would likewise have to be determined, as both would affect an iron weight.

Having now particularly described and ascertained the nature of my said invention and in what manner the same is to be performed, I declare that what I claim is:

1. An apparatus for carrying out the method of determining the variations in the attractive force between masses and particularly in the gravitational or magnetic attraction exerted on a body by the earth, comprising an elongated mass suspended by its two ends within a closed vessel, an upright wire connecting the center of said mass to a means for applying an adjustable torque on said mass so as to deflect said mass from its position of stable equilibrium into a position of unstable equilibrium and means to determine the variations occurring in said state of unstable equilibrium when varying the field of attraction to which said mass is submitted.

2. An apparatus for carrying out the method of determining the variations in the attractive force between masses and particularly in the gravitational or magnetic attraction exerted on a body by the earth, comprising a tube able to be evacuated, and having an opening in the top thereof, a torsion head projecting through the top of said tube and having a close fit with said opening, an oblong mass suspended by its two ends within said tube, an upright wire secured at its top to said torsion head and at its bottom to the center of said mass, so that by rotating the torsion head through a certain angle a torque is applied on said mass which is therefore deflected from its position of stable equilibrium into a position of unstable equilibrium and means to determine the angular displacements of said mass in unstable equilibrium which occur when the field of attraction acting on said mass is varied by displacing the whole suspended system in the space.

3. An apparatus for carrying out the method of determining the variation in the attractive force between masses and particularly in the gravitational or magnetic attraction exerted on a body by the earth, comprising a tube able to be evacuated, and having an opening in the top thereof, a torsion head projecting through the top of said tube and having a close fit with said opening, an oblong mass suspended by its two ends within said tube, two wires made of a material substantially insensitive to changes of temperature for said suspension, an upright wire made of the same material and secured at its top to said torsion head and at its bottom to the center of said mass, so that by rotating the torsion head through a certain angle a torque is applied on said mass which is therefore deflected from its position of stable equilibrium into a position of unstable equilibrium, and means to determine the angular displacements of said mass in unstable equilibrium which occur when the field of attraction acting on said mass is varied by displacing the whole suspended system in the space.

ALFRED BERROTH.